(12) United States Patent
Masuyama (10) Patent No.: US 11,082,648 B2
(45) Date of Patent: Aug. 3, 2021

(54) IMAGING APPARATUS HAVING CORRECTION OF SIGNAL DIFFERENCE

(71) Applicant: CANON KABUSHIKI KAISHA, Tokyo (JP)

(72) Inventor: Kimihiro Masuyama, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/653,299

(22) Filed: Oct. 15, 2019

(65) Prior Publication Data

US 2020/0137328 A1 Apr. 30, 2020

(30) Foreign Application Priority Data

Oct. 24, 2018 (JP) .............................. JP2018-200048

(51) Int. Cl.
*H04N 5/357* (2011.01)
*H04N 5/378* (2011.01)
*H04N 5/374* (2011.01)

(52) U.S. Cl.
CPC ............. *H04N 5/357* (2013.01); *H04N 5/374* (2013.01); *H04N 5/378* (2013.01)

(58) Field of Classification Search
None
See application file for complete search history.

(56) References Cited

U.S. PATENT DOCUMENTS

| | | | | |
|---|---|---|---|---|
| 5,926,214 A * | 7/1999 | Denyer | ................... | H04N 5/361 348/241 |
| 6,801,253 B1 * | 10/2004 | Yonemoto | ......... | H01L 27/14609 250/208.1 |
| 10,334,189 B1 * | 6/2019 | Xu | ......................... | H04N 9/045 |
| 2005/0104985 A1 * | 5/2005 | Abe | ..................... | H04N 3/1562 348/308 |
| 2005/0179795 A1 * | 8/2005 | Funatsu | ............... | H04N 5/3742 348/302 |
| 2012/0312963 A1 * | 12/2012 | Storm | .................... | H04N 5/378 250/208.1 |
| 2014/0036118 A1 * | 2/2014 | Dowaki | ............... | H04N 5/2173 348/294 |
| 2014/0361189 A1 * | 12/2014 | Kameshima | ............. | H04N 5/32 250/393 |
| 2016/0104733 A1 * | 4/2016 | Sato | ..................... | H04N 5/3559 250/208.1 |

FOREIGN PATENT DOCUMENTS

| | | |
|---|---|---|
| JP | 61-264971 A | 11/1986 |
| JP | 2013-157881 A | 8/2013 |

* cited by examiner

*Primary Examiner* — James M Hannett
(74) *Attorney, Agent, or Firm* — Canon U.S.A., Inc. IP Division

(57) ABSTRACT

An imaging apparatus includes a first pixel, a second pixel, a controller, and a correction circuit. The first pixel has a first photoelectric conversion portion. The second pixel has a second photoelectric conversion portion. The controller controls to output a first signal based on reset release of the first pixel and a second signal based on reset release of the second pixel in a first period, and to output a third signal based on photoelectric conversion of the first pixel and a fourth signal based on reset release of the second pixel in a second period. The correction circuit corrects a difference between the third signal and the first signal, using a difference between the fourth signal and the second signal.

10 Claims, 5 Drawing Sheets

IMAGING APPARATUS HAVING CORRECTION OF SIGNAL DIFFERENCE

BACKGROUND

Field

One disclosed aspect of the embodiments relates to an imaging apparatus.

Description of the Related Art

An imaging apparatus such as a digital camera or a video camera includes an image sensor. As the image sensor, a complementary metal oxide semiconductor (CMOS) image sensor has come to be used in place of a charge coupled device (CCD) image sensor. In the CMOS image sensor, a control circuit and an amplifier circuit for driving a plurality of pixels two-dimensionally arranged in rows and columns are shared in a row direction and a column direction. In the image sensor having such a sharing configuration, there is a case where stripe-shaped noise occurs due to factors such as noise occurring in signal readout and circuit-to-circuit variation in each CMOS image sensor.

Japanese Patent Application Laid-Open No. 2013-157881 discusses an imaging apparatus that has a first readout mode for reading out a signal in an Nth row and a second readout mode for reading out a reset level of the same row in order to correct stripe-shaped noise, and corrects a signal output. Meanwhile, Japanese Patent Application Laid-Open No. 61-264971 discusses an imaging apparatus that uses dark output signals in adjacent rows in the same column, for a correction signal.

However, in Japanese Patent Application Laid-Open No. 2013-157881, signals in different columns are used as correction signals and therefore, fixed pattern noise attributable to variations in column amplifier remains. Moreover, some of pixels in a horizontal direction are used as correction pixels and therefore, high-resolution readout cannot be performed.

In Japanese Patent Application Laid-Open No. 61-264971, although fixed pattern noise attributable to variations in column amplifier is eliminated, it is difficult to remove time-dependent extraneous noise, because readouts for adjacent rows vary in time.

SUMMARY

According to an aspect of the embodiments, an imaging apparatus includes a first pixel, a second pixel, a controller, and a correction circuit. The first pixel has a first photoelectric conversion portion. The second pixel has a second photoelectric conversion portion. The controller controls to output a first signal based on reset release of the first pixel and a second signal based on reset release of the second pixel in a first period, and to output a third signal based on photoelectric conversion of the first pixel and a fourth signal based on reset release of the second pixel in a second period. The correction circuit corrects a difference between the third signal and the first signal using a difference between the fourth signal and the second signal.

Further features of the disclosure will become apparent from the following description of exemplary embodiments with reference to the attached drawings.

DESCRIPTION OF THE EMBODIMENTS

Figure 1:
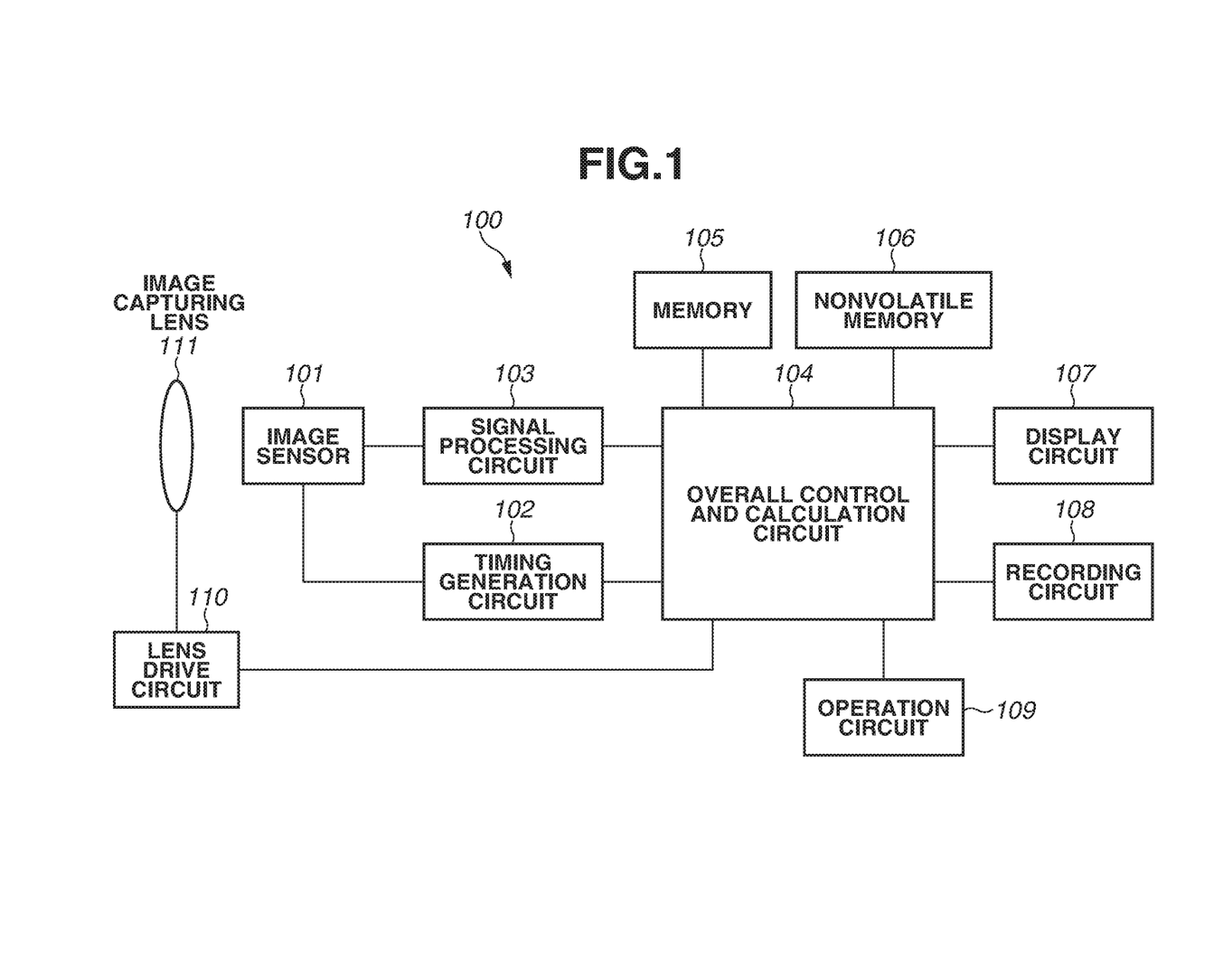
FIG. 1 is a block diagram illustrating a configuration example of an imaging apparatus.

FIG. 1 is a block diagram illustrating a configuration example of an imaging apparatus 100 according to a first exemplary embodiment. The imaging apparatus 100 includes an image sensor 101, a timing generation circuit 102, a signal processing circuit 103, an overall control and calculation circuit 104, a memory 105, and a nonvolatile memory 106. The imaging apparatus 100 further includes a display circuit 107, a recording circuit 108, an operation circuit 109, a lens drive circuit 110, and an image capturing lens 111.

The image capturing lens 111 forms an optical image of an object on the image sensor 101. The lens drive circuit 110 performs control such as zoom control, focus control, and diaphragm control for the image capturing lens 111. The image sensor 101 has a plurality of pixels 200a and 200b (FIG. 2) arranged in a matrix, and converts the optical image of the object into an electric image signal.

The signal processing circuit 103 performs various kinds of correction and compression for the image signal output from the image sensor 101. The signal processing circuit 103 temporarily holds the image signal output from the image sensor 101, and includes an arithmetic logic unit (ALU) for calculating a correction image signal by calculating a value such as a difference. The timing generation circuit 102 outputs a timing signal for driving the image sensor 101.

The overall control and calculation circuit 104 performs various calculations, and controls overall operation of the imaging apparatus 100 including operation of the image sensor 101. The overall control and calculation circuit 104 performs focus detection operation in a phase difference detection method, and calculation of a defocus amount. The overall control and calculation circuit 104 temporarily stores image data output by the signal processing circuit 103 into the memory 105.

The nonvolatile memory 106 stores a program, various thresholds, and adjustment values varying among the imaging apparatuses 100. The display circuit 107 displays various kinds of information and captured images. The recording circuit 108 records or reads out image data. The recording circuit 108 is, for example, a circuit that reads from and writes onto a detachable storage medium such as a semiconductor memory. The operation circuit 109 includes an input device group such as a switch, a button, and a touch panel, and receives a user instruction for the imaging apparatus 100.

Figure 2:
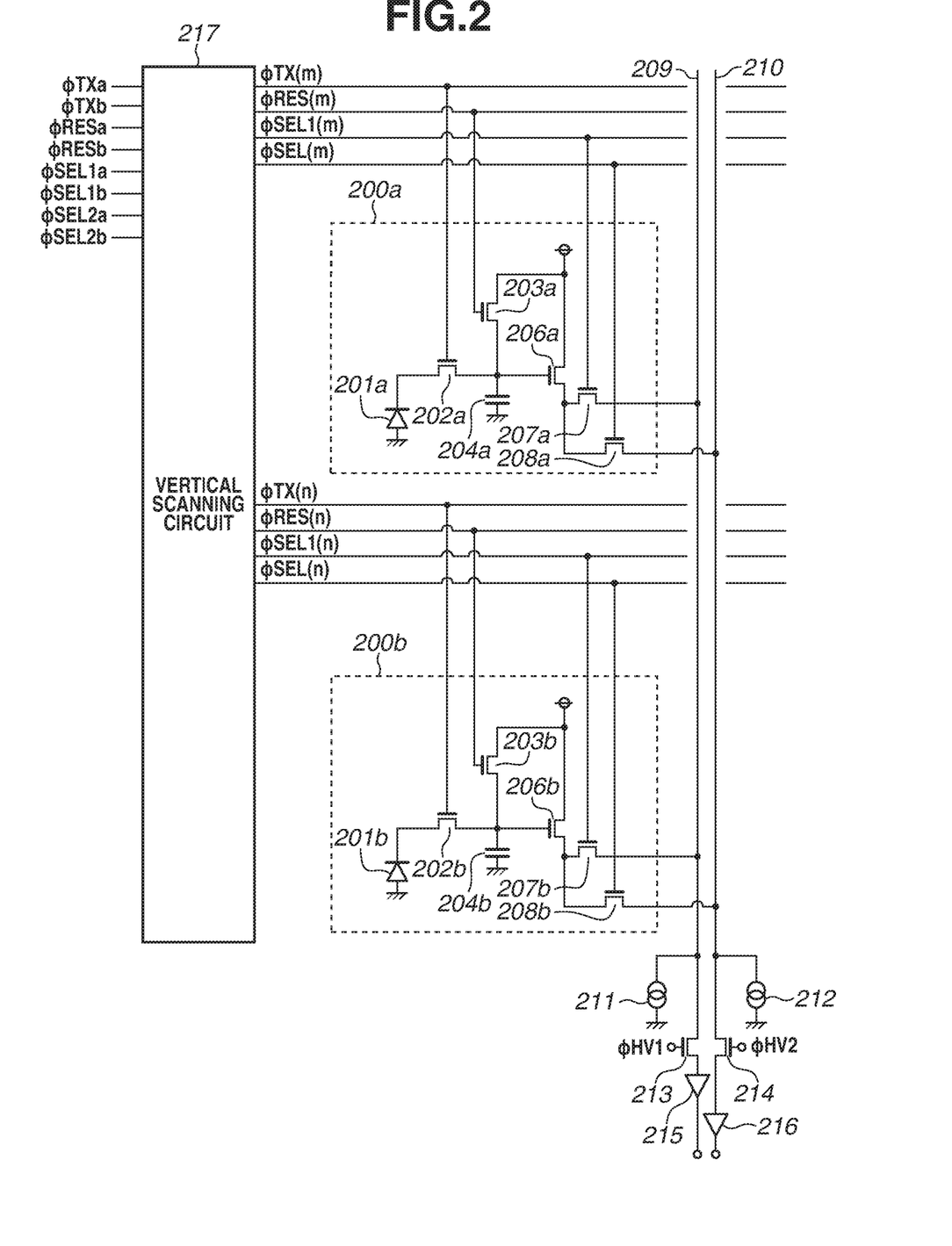
FIG. 2 is a circuit diagram illustrating a configuration example of an image sensor.

FIG. 2 is a circuit diagram illustrating a configuration example of the image sensor 101 in FIG. 1. The image sensor 101 has pixels such as the plurality of pixels 200a and 200b arranged in a matrix, a vertical scanning circuit 217, current sources 211 and 212, transfer switches 213 and 214, and analog-to-digital (A/D) converters 215 and 216. The pixels such as the pixels 200a and 200b arranged in a matrix may be hereinafter referred to as the pixels 200.

The vertical scanning circuit 217 is a controller. The vertical scanning circuit 217 outputs a transfer pulse signal φTX(m) in an mth row to the pixel 200 in the mth row, and outputs a transfer pulse signal φTX(n) in an nth row to the pixel 200 in the nth row, based on transfer pulse signals φTXa and φTXb. Further, the vertical scanning circuit 217 outputs a reset pulse signal φRES(m) in the mth row to the pixel 200 in the mth row, and outputs a reset pulse signal φRES(n) in the nth row to the pixel 200 in the nth row, based on reset pulse signals φRESa and φRESb.

The vertical scanning circuit 217 outputs a selection pulse signal φSEL1(m) in the mth row to the pixel 200 in the mth row, and outputs a selection pulse signal φSEL1(n) in the nth row to the pixel 200 in the nth row, based on selection pulse signals φSEL1a and φSEL1b. Further, the vertical scanning circuit 217 outputs a selection pulse signal φSEL2(m) in the mth row to the pixel 200 in the mth row, and outputs a selection pulse signal φSEL2(n) in the nth row to the pixel 200 in the nth row, based on selection pulse signals φSEL2a and φSEL2b.

The vertical scanning circuit 217 can control transfer switches 202a and 202b, reset switches 203a and 203b, row selection switches 207a, 207b, 208a, and 208b in two rows, independently.

The pixel 200a in the mth row has a photodiode 201a, the transfer switch 202a, the reset switch 203a, a floating diffusion (FD) 204a, a source follower (SF) transistor 206a, and the row selection switches 207a and 208a.

The photodiode 201a is a photoelectric conversion portion. The photodiode 201a converts light into electric charge and accumulates the electric charge. The transfer switch 202a transfers the electric charge converted by the photodiode 201a to the FD 204a, based on the transfer pulse signal φTX(m). The FD 204a is an accumulation portion that accumulates electric charge. The reset switch 203a resets the FD 204a to a power source electric potential, based on the reset pulse signal φRES(m).

The SF transistor 206a outputs a voltage corresponding to the amount of electric charge accumulated in the FD 204a. The row selection switch 207a connects an output node of the SF transistor 206a to an output line 209, based on the selection pulse signal φSEL1(m). The row selection switch 208a connects the output node of the SF transistor 206a to an output line 210, based on the selection pulse signal φSEL2(m).

The pixel 200b in the nth row includes a photodiode 201b, the transfer switch 202b, the reset switch 203b, an FD 204b, an SF transistor 206b, and the row selection switches 207b and 208b.

The photodiode 201b is a photoelectric conversion portion. The photodiode 201b converts light into electric charge and accumulates the electric charge. The transfer switch 202b transfers the electric charge converted by the photodiode 201b to the FD 204b, based on the transfer pulse signal φTX(n). The FD 204b is an accumulation portion that accumulates electric charge. The reset switch 203b resets the FD 204b to the power source electric potential, based on the reset pulse signal φRES(n).

The SF transistor 206b outputs a voltage corresponding to the electric charge accumulated in the FD 204b. The row selection switch 207b connects an output node of the SF transistor 206b to the output line 209, based on the selection pulse signal φSEL1(n). The row selection switch 208b connects the output node of the SF transistor 206b to the output line 210, based on the selection pulse signal φSEL2(n).

The image sensor 101 has the output lines 209 and 210 for the pixels 200 in each column. The pixels 200 in each column are connected to the output lines 209 and 210 common to each column. The row selection switches 207a and 207b, the current source 211, the transfer switch 213, and the A/D converter 215 are connected to the output line 209. The output line 209 is driven by the current source 211. The row selection switches 208a and 208b, the current source 212, the transfer switch 214, and the A/D converter 216 are connected to the output line 210. The output line 210 is driven by the current source 212.

The transfer switch 213 connects the output line 209 to an input node of the A/D converter 215, based on a transfer pulse signal φHV1. The A/D converter 215 converts an analog voltage of the output line 209 into a digital voltage. The transfer switch 214 connects the output line 210 to an input node of the A/D converter 216, based on a transfer pulse signal φHV2. The A/D converter 216 converts an analog voltage of the output line 210 into a digital voltage.

Each of the above-described switches is a metal oxide semiconductor (MOS) transistor. When a high-level voltage is applied to a gate of the MOS transistor, each of the switches enters an ON state, and when a low-level voltage is applied to the gate of the MOS transistor, each of the switches enters an OFF state.

Figure 3:
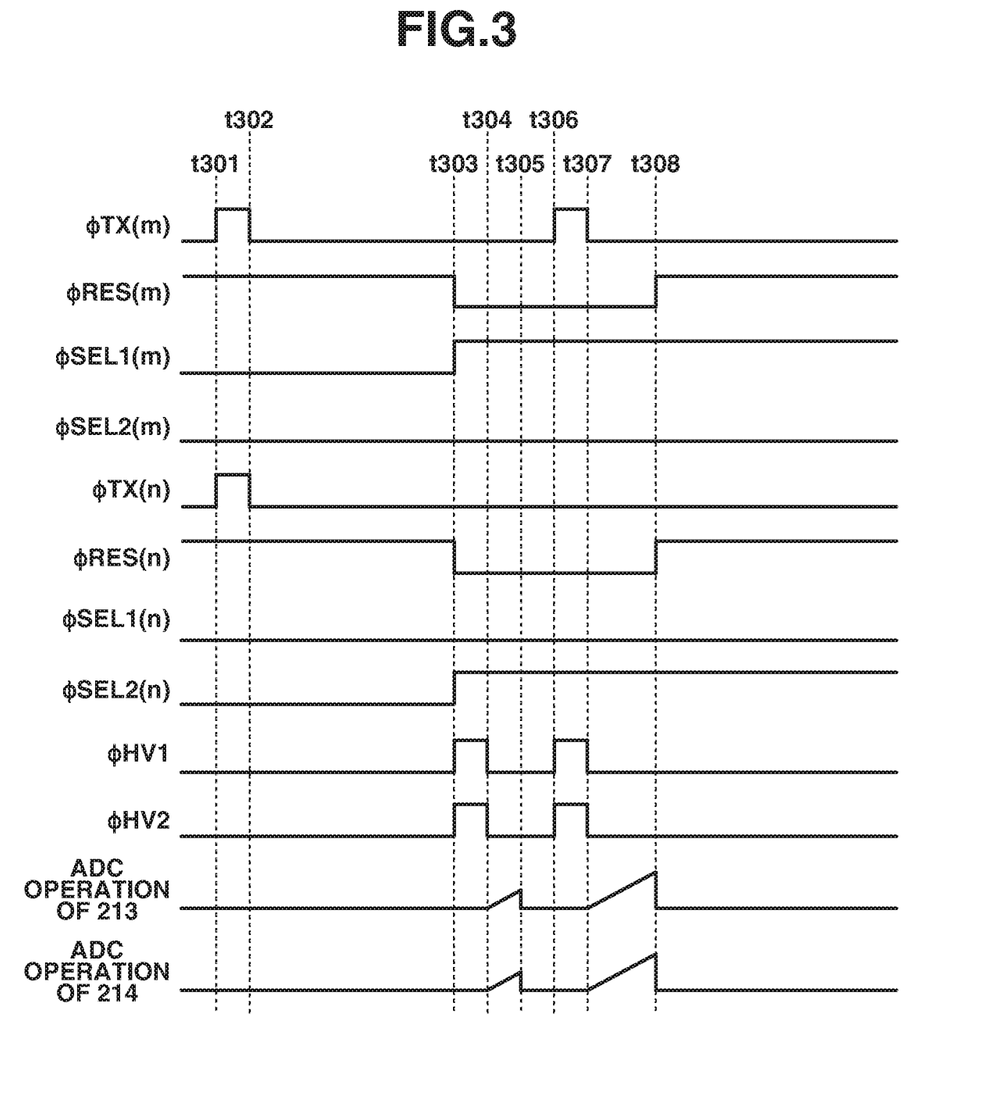
FIG. 3 is a timing chart illustrating operation timing of the image sensor.

FIG. 3 is a timing chart illustrating a control method for the image sensor 101 in FIG. 2, and illustrates a readout driving method during moving-image capturing. A period from a time t301 to a time t302 is a reset period. In the period from the time t301 to the time t302, the vertical scanning circuit 217 brings the transfer pulse signals φTX(m) and φTX(n) and the reset pulse signals φRES(m) and φRES(n) to the high level. Then, the transfer switches 202a and 202b each enter the ON state. The reset switch 203a resets the photodiode 201a and the FD 204a to the power source electric potential. The reset switch 203b resets the photodiode 201b and the FD 204b to the power source electric potential.

A period from the time t302 to a time t307 is a charge accumulation period. In a period from the time t302 to a time t306, the vertical scanning circuit 217 brings the transfer pulse signal φTX(m) to the low level, and brings the transfer pulse signal φTX(n) to the low level at the time t302 and thereafter. Then, the transfer switches 202a and 202b each enter the OFF state. The photodiodes 201a and 201b of all the pixels convert incident light into electric charge and accumulate the electric charge.

A period from a time t303 to a time t308 is a readout period. In the period from the time t303 to the time t308, the vertical scanning circuit 217 brings the selection pulse signals φSEL1(m) and φSEL2(n) to the high level. Then, in the mth row, the row selection switch 207a connects the output node of the SF transistor 206a to the output line 209. In the nth row, the row selection switch 208b connects the output node of the SF transistor 206b to the output line 210.

Further, in the period from the time t303 to the time t308, the vertical scanning circuit 217 brings the reset pulse signals φRES(m) and φRES(n) to the low level. Then, the reset switch 203a cancels reset of the FD 204a. The reset switch 203b cancels reset of the FD 204b.

In a period from the time t303 to the time t306, the SF transistor 206a outputs an N signal based on reset release of the FD 204a to the output line 209. In the period from the time t303 to the time t306, the SF transistor 206b outputs an N signal based on reset release of the FD 204b to the output line 210.

In a period from the time t303 to a time t304, the transfer pulse signals φHV1 and φHV2 change to the high level. Then, the transfer switch 213 transfers the N signal of the output line 209 to the A/D converter 215. The transfer switch 214 transfers the N signal of the output line 210 to the A/D converter 216.

At the time t304, the transfer pulse signals φHV1 and φHV2 change to the low level. Then, the transfer switches 213 and 214 enter the OFF state, and an input signal of each of the A/D converters 215 and 216 is fixed.

In a period from the time t304 to a time t305, the A/D converter 215 performs analog-to-digital conversion of the N signal of the output line 209, and outputs a digital N signal Na(t1) to the signal processing circuit 103. The A/D converter 216 performs analog-to-digital conversion of the N signal of the output line 210 and outputs a digital N signal Nb(t1) to the signal processing circuit 103.

In a period from the time t306 to the time t307, the vertical scanning circuit 217 brings the transfer pulse signal φTX(m) to the high level. Then, the transfer switch 202a enters the ON state, and transfers the electric charge converted by the photodiode 201a to the FD 204a. The FD 204a accumulates the electric charge based on the photoelectric conversion by the photodiode 201a. In a period from the time t306 to the time t308, the SF transistor 206a outputs an S signal based on the photoelectric conversion by the photodiode 201a to the output line 209. In the period from the time t306 to the time t308, the SF transistor 206b outputs an N signal based on reset release of the FD 204b to the output line 210.

In the period from the time t306 to the time t307, the transfer pulse signals φHV1 and φHV2 change to the high level. Then, the transfer switch 213 transfers the S signal of the output line 209 to the A/D converter 215. The transfer switch 214 transfers the N signal of the output line 210 to the A/D converter 216.

At the time t307, the transfer pulse signals φHV1 and φHV2 change to the low level. Then, the transfer switches 213 and 214 each enter the OFF state, and the input signal of each of the A/D converters 215 and 216 is fixed.

In a period from the time t307 to the time t308, the A/D converter 215 performs analog-to-digital conversion of the S signal of the output line 209, and outputs a digital S signal Sa(t2) to the signal processing circuit 103. The A/D converter 216 performs analog-to-digital conversion of the N signal of the output line 210, and outputs a digital N signal Nb(t2) to the signal processing circuit 103.

The S signal Sa(t2) is a signal obtained by superimposing a signal corresponding to electric charge converted by the photodiode 201a on the N signal Na(t1). The signal processing circuit 103 determines a difference Sa(t2)−Na(t1) between the S signal Sa(t2) and the N signal Na(t1), as the pixel signal of the pixel 200a. This makes it possible to obtain a high-quality pixel signal with reduced noise and a fixed pattern from each of the pixels 200a in the mth row.

Further, the N signal Nb(t2) is a signal equivalent to the S signal of the pixel 200b in a case where the pixel 200b is shielded from light. The signal processing circuit 103 determines a difference Nb(t2)−Nb(t1) between the N signal Nb(t1) and the N signal Nb(t2), as the pixel signal of the pixel 200b. This makes it possible to obtain a pixel signal equivalent to a pixel signal in a case where each of the pixels 200b in the nth row is shielded from light.

The A/D converter 215 performs analog-to-digital conversion of the N signal and the S signal of the output line 209 in time division, and outputs the digital N signal Na(t1) and the digital S signal Sa(t2). Therefore, the pixel signal Sa(t2)−Na(t1) of the pixel 200a is affected by, for example, a difference in power source voltage caused by a time lag between the period from the time t303 to the time t304 for reading out the N signal and the period from the time t306 to the time t307 for reading out the S signal.

The N signals Nb(t1) and Nb(t2) of the pixel 200b result from readout of the same N signal at different times and thus include only noise attributable to the above-described time lag. Thus, the pixel signal Nb(t2)−Nb(t1) of the pixel 200b can be used as a noise correction signal of the pixel 200a in the mth row.

The signal processing circuit 103 is a correction circuit, and corrects the pixel signal Sa(t2)−Na(t1) of the pixel 200a in the mth row using the pixel signal (the noise correction signal) Nb(t2)−Nb(t1) of the pixel 200b in the nth row. Specifically, the signal processing circuit 103 subtracts the pixel signal (the noise correction signal) Nb(t2)−Nb(t1) of the pixel 200b in the nth row from the pixel signal Sa(t2)−Na(t1) of the pixel 200a in the mth row.

The imaging apparatus 100 can thereby obtain a high-quality image signal in which noise attributable to the readout timing of each of the N signal and the S signal is reduced.

Here, as for each of the pixels 200a in the mth row, in order to obtain the S signal, the vertical scanning circuit 217 needs exposure based on a slit rolling method of performing reset release and readout while performing sequential scanning. For the pixel 200b in the nth row, the same fixed row may be used in each frame.

As described above, the image sensor 101 reads out the pixel signal of the pixel 200a and the pixel signal of the pixel 200b at the same point in time. The signal processing circuit 103 corrects the pixel signal of the pixel 200a, using the pixel signal of the pixel 200b, so that a high-quality image in which time-dependent noise is removed can obtained.

Figure 4:
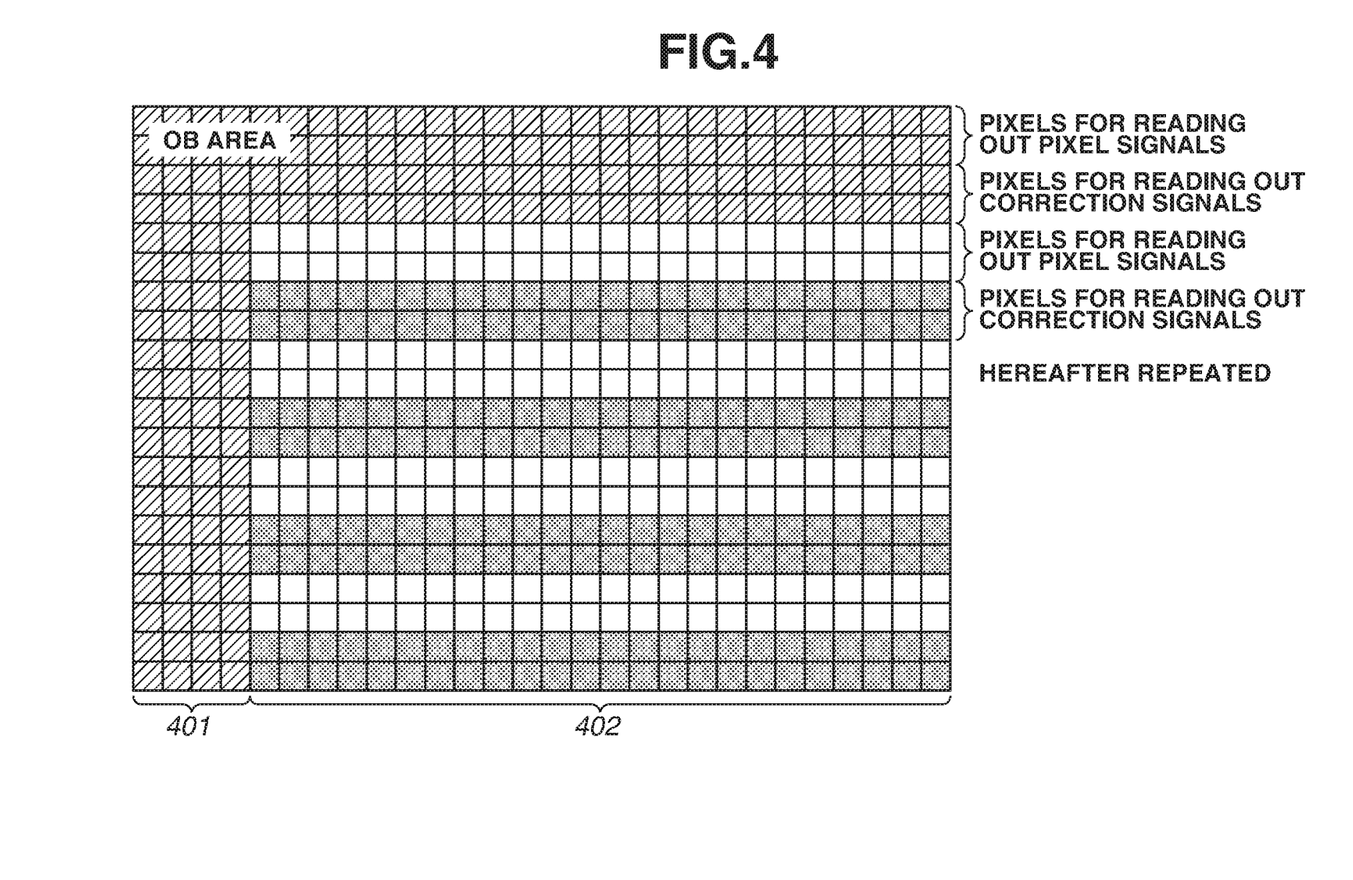
FIG. 4 is a diagram illustrating an example of an arrangement of pixels of the image sensor.

FIG. 4 is a diagram illustrating an example of a layout of the pixels 200 of the image sensor 101, according to a second exemplary embodiment. The image sensor 101 includes the plurality of pixels 200 arranged in a matrix. The image sensor 101 has an optical black (OB) area 401 in which the plurality of pixels 200 are shielded from light, and an effective area 402 in which the plurality of pixels 200 are not shielded from light. The pixel 200 in the OB area 401 is an OB pixel, and the pixel 200 in the effective area 402 is an effective pixel.

In the image sensor 101, two rows of the pixels 200a for reading out pixel signals and two rows of the pixels 200b for reading out correction signals are alternately arranged. The OB area 401 and the effective area 402 each include the pixels 200a for reading out the pixel signals and the pixels 200b for reading out the correction signals.

The signal processing circuit 103 reads out the pixel signals of the pixels 200a and the correction signals of the pixels 200b in all the rows from the image sensor 101, row by row. Specifically, first, the signal processing circuit 103 reads out the pixel signals of the pixels 200a in a first row and the correction signals of the pixels 200b in a third row from the image sensor 101. The signal processing circuit 103 then corrects the pixel signals of the pixels 200a in the first row using the correction signals of the pixels 200b in the third row, column by column.

Subsequently, the signal processing circuit 103 reads out the image signals of the pixel 200a in a second row and the correction signals of the pixel 200b in a fourth row from the image sensor 101. The signal processing circuit 103 then corrects the pixel signals of the pixels 200a in the second row using the correction signals of the pixels 200b in the fourth row, column by column. Likewise, the signal processing circuit 103 repeats the processing for a fifth row and thereafter, so that image signals in which the entire image is corrected are obtained.

As described above, the imaging apparatus 100 reads out the pixel signals from the pixels 200a in some rows and reads out the correction signals from the pixels 200b in other rows. Since the pixels 200a for reading out the pixel signals and the pixels 200b for reading out the correction signals are close to each other, the imaging apparatus 100 can perform effective correction in a case where noise that is highly dependent on time and space is anticipated.

In the first and second exemplary embodiments, the image sensor 101 drives the plurality of output lines 209 and 210 to obtain the pixel signals and the correction signals constantly and therefore, large electric power is necessary. In a third exemplary embodiment, the imaging apparatus 100 drives the image sensor 101 so that the above-described correction signals are obtained only in a case where mixing of extraneous noise is expected due to operation of a noise source.

The operation of the noise source is, for example, driving of the image capturing lens 111. Specifically, the imaging apparatus 100 inhibits appearance of an alternating magnetic field leaked from a coil within the image capturing lens 111 in an image, in a case where a large current fluctuation occurs due to autofocus (AF) operation of the image capturing lens 111 during moving-image capturing. The alternating magnetic field generates an electromotive force and therefore, a voltage supposed to be present cannot be read out, and as a result, the alternating magnetic field may appear in the image as noise.

Figure 5:
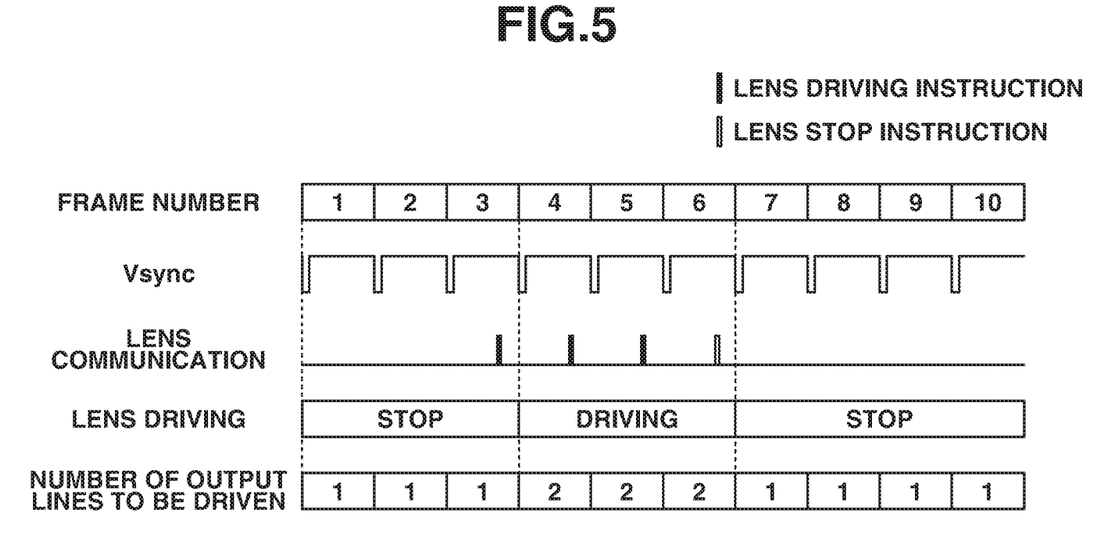
FIG. 5 is a timing chart illustrating an operation state of the imaging apparatus.

FIG. 5 is a timing chart illustrating a control method for the imaging apparatus 100, according to the third exemplary embodiment. The configuration of the imaging apparatus 100 is similar to the configurations in FIG. 1 and FIG. 2. Accordingly, only the points different from the first and second exemplary embodiments will be described below.

The overall control and calculation circuit 104 starts moving-image capturing upon receiving a user instruction, and outputs a vertical synchronization signal Vsync based on a predetermined frame rate. In an example in FIG. 5, the vertical synchronization signal Vsync is defined by a falling edge. The frame of a moving image is generated for every vertical synchronization signal Vsync.

First, in a first frame, the overall control and calculation circuit 104 stops driving of the image capturing lens 111 because an AF evaluation value cannot be calculated. In this case, the timing generation circuit 102 brings the current source 212 of the output line 210 to a stopped state (an OFF state), and drives the image sensor 101 so that readout of all the pixels is performed by using only the output line 209. A second frame and a third frame are similar to the first frame.

The first to third frames are frames in which the image capturing lens 111 is not driven, i.e., frames in which the noise source does not operate. The operation in each of the first to third frames will be described below with reference to FIG. 3, focusing on a difference from FIG. 3. The operation of the pixel 200a is the same as the operation in FIG. 3. The selection pulse signal φSEL2(n) is at the low level, and the pixel 200b does not output the signal to the output line 210. The current source 211 is in the ON state, and the current source 212 is in the OFF state. In the period from the time t303 to the time t306, the pixel 200a outputs the N signal based on the reset release to the output line 209, and the pixel 200b does not output the signal. In the period from the time t306 to the time t308, the pixel 200a outputs the S signal based on the photoelectric conversion to the output line 209, and the pixel 200b does not output the signal. This is the processing of the pixels 200a in the mth row.

Then, the pixels 200b in the nth row may each output the signal in each of the first to third frames. The pixel 200b performs processing similar to the processing of the pixel 200a in FIG. 3. In the period from the time t303 to the time t306, the pixel 200b can output the N signal based on the reset release to the output line 209, via the row selection switch 207b. In the period from the time t306 to the time t308, the pixel 200b can output the S signal based on the photoelectric conversion to the output line 209, via the row selection switch 207b.

Subsequently, in the middle of the third frame, the overall control and calculation circuit 104 issues a lens driving instruction for driving the image capturing lens 111 based on the AF evaluation value, and the timing generation circuit 102 and the lens drive circuit 110 receive the lens driving instruction. Upon receiving the lens driving instruction, the lens drive circuit 110 drives the image capturing lens 111 at the timing of a fourth frame in which the next vertical synchronization signal Vsync changes to the low level.

In this process, because the lens drive circuit 110 drives the image capturing lens 111, a large current fluctuation occurs and thus, there is a possibility that noise appears in the image. Therefore, upon receiving the lens driving instruction, the timing generation circuit 102 drives the image sensor 101 so that the readout using the plurality of output lines 209 and 210 described in the first exemplary embodiment is performed, in the next fourth frame.

In the fourth frame as well, the overall control and calculation circuit 104 issues the lens driving instruction for driving the image capturing lens 111, based on the AF evaluation value. Upon receiving the lens driving instruction, the lens drive circuit 110 drives the image capturing lens 111 in the next fifth frame. Upon receiving the lens driving instruction, the timing generation circuit 102 drives the image sensor 101 so that the readout using the plurality of output lines 209 and 210 described in the first exemplary embodiment is performed, in the next fifth frame.

In the fifth frame as well, the overall control and calculation circuit 104 issues the lens driving instruction for driving the image capturing lens 111 based on the AF evaluation value. Upon receiving the lens driving instruction, the lens drive circuit 110 drives the image capturing lens 111 in the next sixth frame. Upon receiving the lens driving instruction, the timing generation circuit 102 drives the image sensor 101 so that the readout using the plurality of output lines 209 and 210 described in the first exemplary embodiment is performed, in the next sixth frame.

The fourth to sixth frames are frames in which the image capturing lens 111 is driven, i.e., frames in which the noise source operates. In each of the fourth to sixth frames, the imaging apparatus 100 performs operation similar to the operation in the first exemplary embodiment (FIG. 3). Each of the current sources 211 and 212 is in the ON state. In the period from the time t303 to the time t306, the pixel 200a outputs the N signal based on the reset release to the output line 209, and the pixel 200b outputs the N signal based on the reset release to the output line 210. In the period from the time t306 to the time t308, the pixel 200a outputs the S signal based on the photoelectric conversion to the output line 209, and the pixel 200b outputs the N signal based on the reset release to the output line 210.

In the middle of the sixth frame, the overall control and calculation circuit 104 issues a lens stop instruction for stopping the driving of the image capturing lens 111, based on the AF evaluation value. Upon receiving the lens stop instruction, the lens drive circuit 110 stops the driving of the image capturing lens 111, in the next seventh frame. Upon receiving the lens stop instruction, the timing generation circuit 102 brings the current source 212 of the output line 210 to the stopped state (the OFF state), and drives the image sensor 101 so that the readout of all the pixels is performed by using only the output line 209, in the next seventh frame. The electric power of the image sensor 101 is thereby reduced.

In the seventh frame to a tenth frame, the overall control and calculation circuit 104 issues neither the lens driving instruction nor the lens stop instruction. In an eighth frame to the tenth frame, the lens drive circuit 110 stops the driving of the image capturing lens 111 as in the seventh frame. The timing generation circuit 102 brings the current source 212 of the output line 210 to the stopped state (the OFF state), and drives the image sensor 101 so that the readout of all the pixels is performed by using only the output line 209.

The seventh to tenth frames are frames in which the image capturing lens 111 is not driven, i.e., frames in which the noise source does not operate. The operation in the seventh to tenth frames are similar to the operation in the first to third frames.

As described above, the imaging apparatus 100 can obtain a high-quality image in which time-dependent noise is removed while reducing the electric power, by performing the readout using the plurality of output lines 209 and 210, only in a case where occurrence of noise is expected.

Exemplary embodiments of the disclosure has been described, but the disclosure is not limited to these exemplary embodiments, and various alternations and modifications can be made without departing from the scope of the gist thereof. The imaging apparatus 100 is described to include the image sensor 101 and the signal processing circuit 103 as separate configurations, but can also be implemented by using a laminated image sensor in which the signal processing circuit 103 is stacked on the image sensor 101 to increase an image processing speed. The imaging apparatus 100 is applicable to a digital camera, a video camera, a smartphone, a tablet, an industrial camera, a medical camera, and an on-vehicle camera.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-200048, filed Oct. 24, 2018, which is hereby incorporated by reference herein in its entirety.

What is claimed is:

1. An imaging apparatus comprising:
   a first pixel having a first photoelectric conversion portion;
   a second pixel having a second photoelectric conversion portion;
   a controller that controls to output a first signal based on reset release of the first pixel and a second signal based on reset release of the second pixel in a first period, and to output a third signal based on photoelectric conversion of the first pixel and a fourth signal based on reset release of the second pixel in a second period; and
   a correction circuit that corrects a difference between the third signal and the first signal by subtracting a difference between the fourth signal and the second signal from the difference between the third signal and the first signal.

2. The imaging apparatus according to claim 1,
   wherein the first pixel includes the first photoelectric conversion portion that converts light into electric charge, a first accumulation portion, and a first transfer switch that transfers the electric charge converted by the first photoelectric conversion portion to the first accumulation portion, and the first pixel outputs a signal corresponding to an electric charge amount of the first accumulation portion, and
   wherein the second pixel includes the second photoelectric conversion portion that converts light into electric charge, a second accumulation portion, and a second transfer switch that transfers the electric charge converted by the second photoelectric conversion portion to the second accumulation portion, and the second pixel outputs a signal corresponding to an electric charge amount of the second accumulation portion.

3. The imaging apparatus according to claim 2, wherein the controller performs control to output the first signal based on reset release of the first accumulation portion in a state where the first transfer switch of the first pixel is in an OFF state and output the second signal based on reset release of the second accumulation portion in a state where the second transfer switch of the second pixel is in an OFF state, in the first period, and to output the third signal based on photoelectric conversion of the first photoelectric conversion portion in a state where the first transfer switch of the first pixel is in an ON state and output the fourth signal based on reset release of the second accumulation portion in a state where the second transfer switch of the second pixel is in the OFF state, in the second period.

4. The imaging apparatus according to claim 1, further comprising:
 a first output line; and
 a second output line,
 wherein the first pixel outputs the first signal to the first output line and the second pixel outputs the second signal to the second output line in the first period, and the first pixel outputs the third signal to the first output line and the second pixel outputs the fourth signal to the second output line in the second period.

5. The imaging apparatus according to claim 1, further comprising:
 a row of the first pixels each including the first photoelectric conversion portion; and
 a row of the second pixels each including the second photoelectric conversion portion,
 wherein the correction circuit performs correction column by column.

6. The imaging apparatus according to claim 5, wherein two rows of the first pixels and two rows of the second pixels are alternately arranged.

7. The imaging apparatus according to claim 1,
 wherein in a frame in which a noise source operates, the controller performs control to output the first signal based on reset release of the first pixel and the second signal based on reset release of the second pixel in the first period, and to output the third signal based on photoelectric conversion of the first pixel and the fourth signal based on reset release of the second pixel in the second period,
 and
 wherein in a frame in which the noise source does not operate, the controller performs control to output the first signal based on reset release of the first pixel in the first period, and to output the third signal based on photoelectric conversion of the first pixel in the second period.

8. The imaging apparatus according to claim 4,
 wherein in a frame in which a noise source operates, the controller performs control to output the first signal based on reset release of the first pixel to the first output line and the second signal based on reset release of the second pixel to the second output line in the first period, and to output the third signal based on photoelectric conversion of the first pixel to the first output line and the fourth signal based on reset release of the second pixel to the second output line in the second period,
 and
 wherein in a frame in which the noise source does not operate, the controller performs control to output the first signal based on reset release of the first pixel to the first output line in the first period, and to output the third signal based on photoelectric conversion of the first pixel to the first output line in the second period.

9. The imaging apparatus according to claim 8, further comprising:
 a first current source that is connected to the first output line; and
 a second current source that is connected to the second output line,
 wherein in the frame in which the current source operates, each of the first current source and the second current source is in an ON state, and
 wherein in the frame in which the current source does not operate, the first current source is in the ON state and the second current source is in an OFF state.

10. The imaging apparatus according to claim 7, wherein the frame in which the noise source operates is a frame in which a lens is driven, and the frame in which the noise source does not operate is a frame in which the lens is not driven.

* * * * *